March 31, 1953 D. M. KING 2,633,088
TROLLEY CONVEYER
Filed Oct. 18, 1950
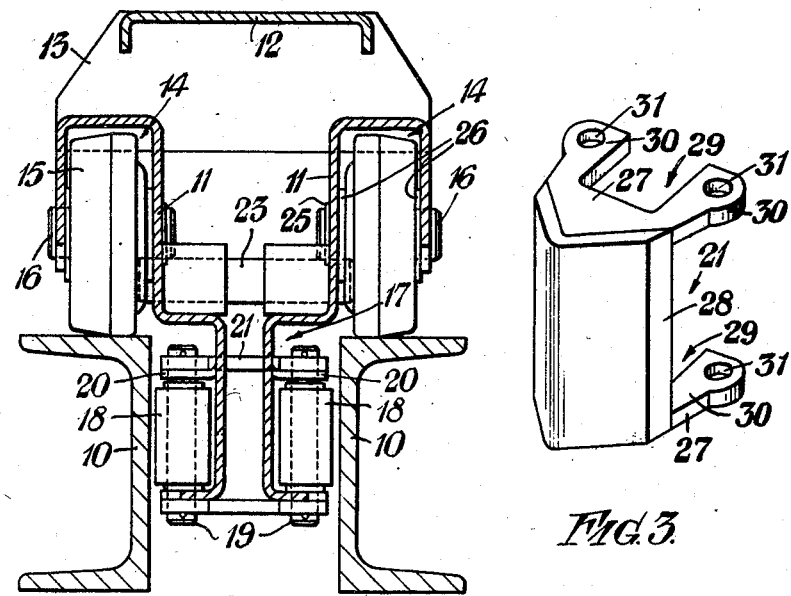
FIG. 1.
FIG. 3.
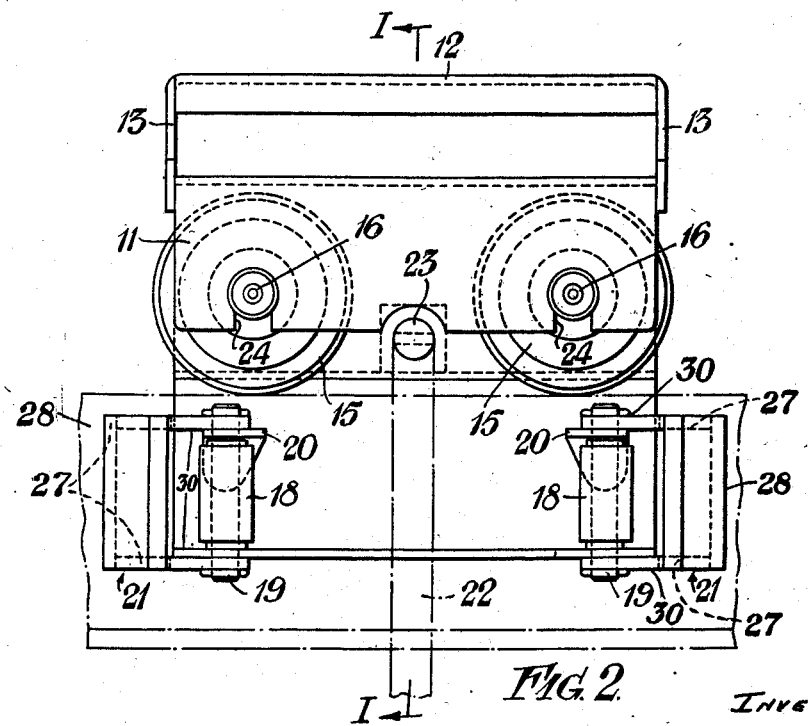
FIG. 2.
INVENTOR
Donald Mayer King
By Hazeltine, Lake & Co.
AGENTS Patented Mar. 31, 1953

2,633,088

UNITED STATES PATENT OFFICE 2,633,088

TROLLEY CONVEYER

Donald Mayer King, Hitchin, England

Application October 18, 1950, Serial No. 190,749
In Great Britain October 20, 1949

3 Claims. (Cl. 105—155)

This invention relates to suspended or overhead conveyors of the kind which include a fixed overhead track for supporting a plurality of trolleys or the like which are adapted to travel over the said track, the trolleys, from which the loads to be conveyed are suspended, being propelled manually or through the medium of a chain or similar flexible element to which a drive is imparted in any convenient manner.

It is the chief object of the invention to evolve an improved trolley for use in a conveyor of the kind set forth.

According to the invention the trolley is made up of pressed steel or other suitable metal plates and includes a plurality of wheels or rollers adapted to support said trolley when placed in position on the fixed overhead track, means also being incorporated adapted to co-operate with said track in such a manner as to take up any lateral thrust imparted to the trolley and thereby to maintain the same in position on the track.

In order that the invention may be clearly understood and readily carried into effect the same will now be more fully described with reference to the accompanying drawings, in which:

Figure 1 is a section on the line 1—1 of Figure 2,

Figure 2 is a side elevational view of a trolley,

Figure 3 is a perspective view of a detail.

The trolley illustrated in the drawings is adapted to be propelled along an overhead runway or track comprising two rail members disposed in parallel relationship, said trolley being adapted to support a load bar which projects downwardly therefrom between the rail members and to which a load may be attached. While the trolley may be propelled manually along the track it will more often be driven therealong by means of a pusher dog or abutment which is carried by a driven chain located above the path of movement of said trolley, said pusher dog or abutment being adapted to bear against the upper part of the trolley.

Referring now to the drawings, 10 denotes an overhead track on which the trolley is adapted to run, such track comprising a pair of channelled members arranged in spaced parallel relationship. As will be seen from the drawings the trolley is made up of or comprises two pressed steel side plates 11 which are of similar formation, being arranged back to back and in parallel relationship. The side plates 11 are rigidly interconnected at their upper parts by means of a hood which is welded or otherwise suitably secured to said plates, such hood comprising in the embodiment illustrated a pressed steel top plate 12 and two end plates 13 which are welded together. If desired the hood i. e. the top plate and the end plates may be made in one piece.

As will be seen from Figure 2 each plate is so formed at its upper part as to provide a channel 14 of substantially inverted U-shape which channel is adapted to house two wheels or rollers 15 arranged in tandem. Each wheel or roller 15 is rotatably mounted on a spindle 16 suitably supported in the walls of the appropriate channel. The construction is such that the wheels or rollers 15 will engage and run on the channelled members comprising the track 10. In the embodiment illustrated each spindle 16, adjacent that end which is to constitute the outer end when in use, is formed with a flattened or reduced portion so dimensioned that it will constitute a sliding fit in any one of the slots 24 in the outer walls of the channels 14. The construction is such that when for example the right-hand roller 15 of Figure 1 is to be mounted in position the spindle 16 is introduced through the central bore in said roller until the inner end thereof is flush or substantially flush with the left hand side of the roller whereupon the latter may be introduced into the channel 14 so that the flattened portion of the spindle 16 which is projecting from the right-hand side of said roller will register with the slot 24. The roller and spindle 16 are moved upwardly (having reference to Figure 1) until the inner end of the spindle is in alignment with an aperture in the inner wall of the channel 14 whereupon said spindle may then be pushed to the left to bring the head on the outer end thereof into contact with the outer face of the outer wall of the channel. In this position a spring clip such as the clip 25 may readily be applied over the inner end of the spindle 16 thereby to lock the same in place. In order to centre the roller with respect to the channel 14 suitable washers 26 are located on the spindle 16 during assembly. It will be appreciated that during mounting or removal of the rollers, the trolley will not be in position on the track as shown.

As will be apparent from the drawings the plates 11 are so formed as to provide the trolley with a portion 17 of decreased width which is adapted to project into the space between the channelled members comprising the track 10. Mounted at each side of the depending portion 17 of the trolley are two rollers 18 which are freely rotatable about vertical axes, the arrangement being such that said rollers 18 will bear on the vertical webs of the channelled members forming the track thereby to take up any lateral or horizontal thrust on the trolley. Each roller 18 is rotatably mounted on a spindle 19 which is supported at its upper end in a lug or ear 20 pressed out of the plate 11 and at its lower end in an out-turned flange extending along the lower edge of the plate. As will be apparent from the drawings the rollers 18 are arranged in pairs adjacent the opposite ends of the trolley, the rollers of each pair being situated at opposite sides of said trolley. Each pair of spindles 19 is also adapted to support a guide member, designated generally by 21, (shown separately in Figure 3) which is adapted to embrace the ends of the plates thereby to prevent any tendency to undesired relative movement therebetween and also to form guide means for the trolley.

As will be seen from the drawings each guide member 21 comprises upper and lower plates 27 which are arranged in spaced parallel relationship and are so shaped as to support a V or substantially V-shaped plate 28, the latter being welded to said plates 27. The plates 27 are each formed with a recess 29, the arrangement being such that on application of a guide member to a trolley the portions 30 of said plates will embrace the ends of the lower portions of the plates 11, said portions 30 being formed with apertures 31 adapted to accommodate the aforesaid spindles 19. As indicated above, the guide members 21 will serve to prevent any tendency to undesired relative movement between the plates 11 and also by virtue of their V-shaped profile they will serve to guide the trolley when the latter is negotiating a bend or curve in the track or a track switch point.

Disposed between those portions of the side plates 11 which together constitute the depending portion of the trolley is a load bar or equivalent device 22 which latter is adapted to project downwardly below the trolley and is so formed as to allow of the attachment of loads thereto. The load bar or the like is pivotally mounted at its upper part on a transverse pin or the like 23 carried by the two side plates 11. In the embodiment illustrated the load bar is located centrally or substantially centrally with respect to the length of the trolley, the pin 23 being located midway between the axes of rotation of the forward and rearward pairs of wheels or rollers 15.

The dimensions and actual formation of the pressed steel side plates may be varied as required and, if desired, each trolley may be provided with any desired number of pairs of wheels or rollers adapted to engage the overhead conveyor track. Similarly, instead of providing two vertical rollers at each side of the depending portion of the trolley to take up lateral thrust it may be desirable to incorporate one, three or any other desired number or to provide a series of balls or other equivalent devices.

I claim:

1. A trolley for a conveyor system such trolley comprising two pressed metal plates of similar formation which are arranged back to back and are maintained in spaced parallel relationship to provide a body having two upper side wall portions and two lower side wall portions which are inset in relation to said upper side wall portions, each of said upper side wall portions being bent over outwardly at its upper part to provide an inverted channel section extending longitudinally thereof, a set of wheels rotatably mounted in each of said channelled sections to engage and run on a track comprising two parallel rail members between which latter said lower wall portions of said trolley are adapted to project, and rollers mounted at opposite sides of said lower wall portions to rotate about axes at right angles to the axes of the aforesaid wheels in such a manner as to engage vertical surfaces on the rail members of the track and thereby to take up any lateral thrust that may be imparted to the trolley when in use.

2. A trolley as claimed in claim 1, and including a sheet metal hood which is adapted to bridge the space between the upper side wall portions of the trolley and to be secured by end plates to said portions thereby to maintain the metal plates forming the body of said trolley in spaced parallel relationship.

3. A trolley for a conveyor system, such trolley comprising two pressed metal plates of similar formation which are arranged back to back and are maintained in spaced parallel relationship to provide a body having two upper side wall portions and two lower side wall portions which are inset in relation to said upper side wall portions, each of said upper side wall portions being bent over outwardly at its upper part to provide an inverted channel section extending longitudinally thereof, a set of wheels rotatably mounted in each of said channelled sections to engage and run on a track comprising two parallel rail members between which latter said lower wall portions of said trolley are adapted to project, rollers mounted at opposite sides of said lower wall portions to rotate freely about axes at right angles to the axes of the aforesaid wheels thereby to bear on vertical surfaces on the rail members, and guide members adapted to be applied at the opposite ends of the lower side wall portions, said members being so shaped as to embrace said latter portions, thereby to prevent relative lateral movement between them and also to serve as guide means for the trolley.

DONALD MAYER KING.

REFERENCES CITED

The following references are of record in the file of this patent:

UNITED STATES PATENTS

| Number | Name | Date |
| --- | --- | --- |
| 426,885 | Walling | Apr. 29, 1890 |
| 452,791 | Jackman | May 26, 1891 |
| 1,443,382 | Rapier | Jan. 30, 1923 |
| 1,480,232 | Trimble | Jan. 8, 1924 |
| 1,876,904 | Francis | Sept. 13, 1932 |
| 2,494,009 | Sharp | Jan. 10, 1950 |